(12) United States Patent
Mun

(10) Patent No.: US 10,242,668 B2
(45) Date of Patent: Mar. 26, 2019

(54) SPEECH RECOGNITION APPARATUS AND METHOD

(71) Applicant: Samsung Electronics Co., Ltd., Suwon-si (KR)

(72) Inventor: Min Young Mun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/227,426

(22) Filed: Aug. 3, 2016

(65) Prior Publication Data

US 2017/0069314 A1 Mar. 9, 2017

(30) Foreign Application Priority Data

Sep. 9, 2015 (KR) .................. 10-2015-0127916

(51) Int. Cl.
*G06F 17/27* (2006.01)
*G06F 17/28* (2006.01)
*G10L 15/183* (2013.01)
*G10L 15/22* (2006.01)

(52) U.S. Cl.
CPC ...... *G10L 15/183* (2013.01); *G10L 2015/227* (2013.01)

(58) Field of Classification Search
CPC ....... G10L 15/183; G10L 15/22; G10L 15/26; G10L 15/18; G10L 15/063; G10L 15/065; G10L 15/265; G10L 15/08; G06F 17/28; G06F 17/289

USPC ..... 704/236, 239, 1–10, 257, 277, 230–231, 704/246, 250–251, 243
See application file for complete search history.

(56) References Cited

U.S. PATENT DOCUMENTS

| | | | |
|---|---|---|---|
| 6,167,377 A * | 12/2000 | Gillick | G10L 15/063 704/240 |
| 6,484,136 B1 * | 11/2002 | Kanevsky | G06F 17/2765 704/255 |
| 9,129,606 B2 * | 9/2015 | Chang | G10L 15/34 |
| 9,361,289 B1 * | 6/2016 | Jampani | G10L 15/00 |
| 9,747,895 B1 * | 8/2017 | Jansche | G10L 15/183 |
| 2004/0085162 A1 * | 5/2004 | Agarwal | G10L 15/22 333/196 |
| 2004/0220813 A1 | 11/2004 | Weng et al. | |
| 2011/0161072 A1 | 6/2011 | Terao et al. | |
| 2012/0316877 A1 | 12/2012 | Zweig et al. | |
| 2013/0346077 A1 | 12/2013 | Mengibar et al. | |
| 2014/0025380 A1 * | 1/2014 | Koch | G10L 15/1822 704/257 |

(Continued)

FOREIGN PATENT DOCUMENTS

JP 2011-107314 A 6/2011
JP 2013-182260 A 9/2013

(Continued)

*Primary Examiner* — Dwayne D Bost
*Assistant Examiner* — Stephen M Brinich
(74) *Attorney, Agent, or Firm* — NSIP Law

(57) ABSTRACT

An apparatus includes a language model group identifier configured to identify a language model group based on determined characteristic data of a user, and a language model generator configured to generate a user-based language model by interpolating a general language model for speech recognition based on the identified language model group.

17 Claims, 7 Drawing Sheets

(56) References Cited

U.S. PATENT DOCUMENTS

2014/0214419 A1\* 7/2014 Rao ...................... G10L 15/063
                                                                    704/240
2017/0301346 A1\* 10/2017 Selfridge ................ G10L 15/02

FOREIGN PATENT DOCUMENTS

| KR | 10-2013-0068624 A | 6/2013 |
| WO | WO 2010/021368 A1 | 2/2010 |

\* cited by examiner

SPEECH RECOGNITION APPARATUS AND METHOD

CROSS-REFERENCE TO RELATED APPLICATION(S)

This application claims the benefit under 35 USC § 119(a) of Korean Patent Application No. 10-2015-0127916, filed on Sep. 9, 2015, in the Korean Intellectual Property Office, the entire disclosure of which is incorporated herein by reference for all purposes.

BACKGROUND

1. Field

The following description relates to a speech recognition apparatus and method.

2. Description of Related Art

Recently, a speech recognition interface has been increasingly used, and research has been conducted to improve accuracy of speech recognition. Particularly, a speech recognition engine generally includes an acoustic model and a language model for speech recognition that is resistant to noise. An acoustic model may attempt to recognize a suitable phoneme, or alphabetic character, based on pronunciation or phonetics, while a language model may attempt to recognize such linguistic units of a speech or combination of the same as words, for example, based on temporal connectivity between such words, for example, over time.

Thus, while the acoustic model may be personalized for a specific user within a short period of time, the language model used by a user is difficult to be obtained in a short period of time, since there may generally be differences between words used in text training to obtain the language model and words used in the spoken language.

Further, in an existing speech recognition apparatus, only one general language model is used to recognize speech of all users, which increases the size of the pool of words, and performance of speech recognition is guaranteed only when speech is made in order of frequently used words.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus includes a language model group identifier configured to identify a language model group based on determined characteristic data of a user, and a language model generator configured to generate a user-based language model by interpolating a general language model for speech recognition based on the identified language model group.

The apparatus may further include a characteristic data collector configured to collect the characteristic data of the user. The characteristic data collector may be configured to present a specific image or inquiry to the user, and collect the characteristic data of the user based on a response of the user to the image or inquiry. The characteristic data of the user may include any one or any combination of any two of static information that may include any one or any combination of any two or more of gender, age, address, frequently used applications, and biometric data; and dynamic information that may include any one or any combination of any two or more of a tone, amplitude, and tempo of a user's voice, and frequently used keywords.

The language model generator may include a weighted value calculator configured to calculate a weighting based on a similarity between the characteristic data of the user and the identified language model group. The language model generator may further include a language model interpolator configured to interpolate the general language model based on the calculated weighting.

The apparatus may be a speech recognition apparatus that further includes a speech recognizer configured to recognize speech of the user based on an acquired user-based language model.

In another general aspect, a speech recognition apparatus includes a language model acquirer configured to acquire a user-based language model upon receiving a speech recognition request from a user, and a speech recognizer configured to recognize speech of the user based on the acquired user-based language model.

The language model acquirer may be further configured to select the language model from a language model database that stores user-based language models for different users a memory. In response to the speech recognition request of the user, the language model acquirer may be further configured to generate multiple user-based language models corresponding to multiple users by determining a language model group to be applied to each user's speech from one or more language model groups and by interpolating a general language model for speech recognition based on the determined language model group for each user. The speech recognition apparatus may be a smartphone, tablet, laptop, or smartwatch.

In response to the speech recognition request of the user, the language model acquirer may be further configured to generate the user-based language model by determining a language model group to be applied to the user's speech from one or more language model groups and by interpolating a general language model for speech recognition based on the determined language model group.

In another general aspect, a method of generating a user-based language model for speech recognition includes identifying a language model group based on characteristic data of a user, and generating a language model by interpolating a general language model based on the identified language model group.

The method may further include collecting the characteristic data of the user. The collecting of the characteristic data of the user may include presenting a specific image or inquiry to the user, and collecting the characteristic data of the user based on a response of the user to the image or inquiry. The characteristic data of the user may include any one or any combination of any two of static information that may include any one or any combination of any two or more of gender, age, address, frequently used applications, and biometric data, and dynamic information that may include any one or any combination of any two or more of a tone, amplitude, and tempo of a user's voice, and frequently used keywords.

The generating of the language model may include calculating a weighting based on a similarity between the characteristic data of the user and the identified language model group. The generating of the language model further includes interpolating the general language model based on the calculated weighting.

In another general aspect, a speech recognition apparatus includes a processor configured to acquire a user-based language model upon receiving a speech recognition request from a user, and recognize speech of the user based on the acquired user-based language model.

The processor may include a language model acquirer, configured to acquire the user-based language model upon receiving the speech recognition request from the user, and a speech recognizer configured to recognize speech of the user based on the acquired user-based language model.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Figure 1:
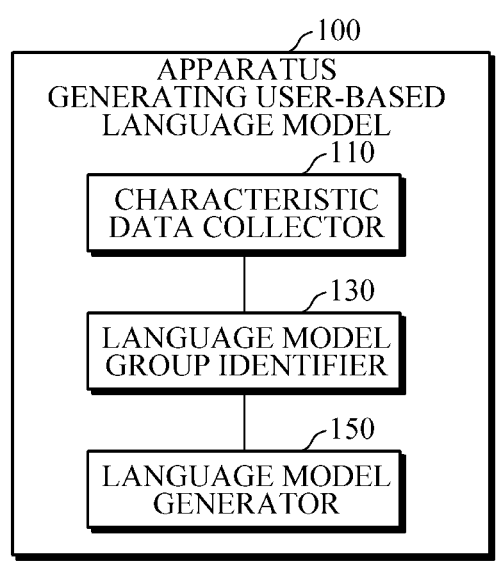
FIG. 1 is a block diagram illustrating an apparatus generating a user-based language model according to an embodiment.

FIG. 1 is a block diagram illustrating an apparatus generating a user-based language model according to an embodiment. Referring to FIG. 1, the apparatus 100 generating a user-based language model includes a characteristic data collector 110, a language model group identifier 130, and a language model generator 150.

The characteristic data collector 110 collects characteristic data of a user. Here, the characteristic data includes at least one of the following: static information that, for example, includes one or more of gender, age, address, frequently used applications, and biometric data; and dynamic information that includes, for example, frequently used keywords which may change depending on circumstances. Further, while collecting the dynamic information, the characteristic data collector 110 collects acoustic data, including a tone, amplitude, and tempo of a user's voice, which may be used as dynamic data to identify a language model. Further, the tone, amplitude, and tempo of a user's voice may be used to generate a personalized acoustic model.

The characteristic data collector 110 collects characteristic data of a user by retrieving information retrieved and/or stored in one or more electronic devices used by a user, or by retrieving text data of applications used by a user. For example, the characteristic data collector 110 may collect information, such as a user's gender, age, and address, for example, by retrieving personal information stored in an electronic device used by a user. In another example, the characteristic data collector 110 may be connected to a microphone of the apparatus 100 or an electronic device of a user to collect characteristic information that includes the tone, amplitude, and tempo of a user's voice. In another example, the characteristic data collector 110 may collect characteristic data of a user by actively making an inquiry to a user.

In one embodiment, the characteristic data collector 110 presents a specific image or inquiry to a user, and collects user characteristic data based on the user's response to the image or inquiry. For example, the characteristic data collector 110 may generate inquiries about a user according to at least one or more of criteria among types and frequency of use of mass media frequently used by a user, types and frequency of use of Internet media frequently used by a user, age, gender, place of birth, residence, occupation, education level, hobby, and field of interest. The criteria may be the same as or similar to the ones used to generate a language model group to be applied to a user. For example, in the case where the characteristic data collector 110 generates a language model based on a user's age and gender, the characteristic data collector 110 may generate inquiries about age and gender.

In another example, the characteristic data collector 110 may generate inquiries by extracting a keyword regarding at least one of a specific subject and specific circumstances. For example, the characteristic data collector 110 may extract a smartphone as a keyword, and may generate an image or inquiry related to a smartphone to make an inquiry to a user.

In this case, the characteristic data collector 110 may select at least one or more keywords that have high similarity in each language model group, and at the same time have low similarity between language model groups. For example, in the case where a language model group is generated based on a user's age, teenagers to the thirties use the word "smartphone', the forties to fifties use the word "cellphone", and the sixties or older use the word "phone", for an identical smartphone. That is, a group of similar ages use the same word for a specific object, while a group of different ages use different words for a specific object, in which case the characteristic data collector 110 may generate an image of a smartphone as an inquiry, and may receive a user's response to the inquiry to collect characteristic data of the user.

The language model group identifier 130 may identify a language model group based on the user characteristic data.

For example, the language model group identifier 130 may select a language model group by using the characteristic data collected by the characteristic data collector 110. For example, in the case where a language model group is generated based on a user's age, the language model group identifier 130 extracts information regarding a user's age from the user characteristic data to identify a language model group to be applied to the user.

For example, as described above, in the case where different words are used for a smartphone depending on age groups of users, the language model group identifier 130 extracts a word, which is similar to a smartphone, from the user characteristic data, and performs matching of the extracted word with each language model group to identify a language model group that has the highest similarity. For example, as described above in the example of the characteristic data collector 110, when users use the word "phone", the language model group identifier 130 may determine that the users are in their sixties or older, and may identify a language model group generated for the sixties or older as a language model group to be used for the users.

The language model generator 150 may interpolate a general language model based on the identified language model group, and may generate a language model to be applied to a user. For example, the language model may be a network that specifies words that may come after each word. In this case, the language model generator 150 may form a new network by reflecting the types and probabilities of words that may follow each word included in the identified general language model into words and probabilities of the words included in the identified language model group. For example, the general language model may have a string of words or phrase, such as "a phone" followed by "make a call," and "send a text message." In the case of applying a user's language model group, the user uses the word "phone" to refer to the same meaning as a smartphone, such that a string of words, including "search on the Internet," or "listen to music" may be added.

Figure 2:
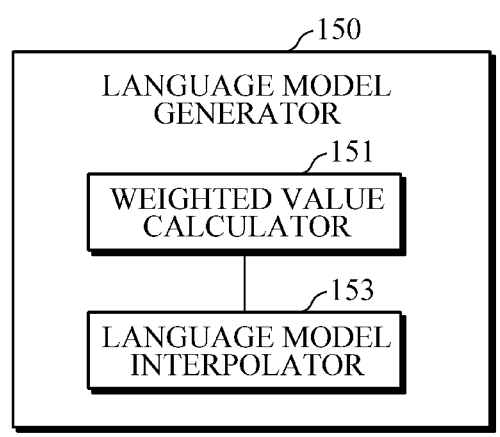
FIG. 2 is a block diagram illustrating a language model generator according to an embodiment.

FIG. 2 is a block diagram illustrating a language model generator 150 according to an embodiment. Referring to FIG. 2, the language model generator 150 includes a weighted value calculator 151 and a language model interpolator 153. The weighted value calculator 151 calculates a weighted value based on a similarity between the user characteristic data and the determined language model group.

For example only, a language model group is selected by extracting information on a user's age from the user characteristic data, and the probability of age being sixties or older is calculated to be 0.6, and the probability of age being forties to fifties is calculated to be 0.4. In this case, a weighted value of a language model group generated for the sixties or older is calculated to be 0.6, and a weighted value of a language model group generated for the forties to fifties is calculated to be 0.4. The weighted value calculator 151 may interpolate the general language model based on the calculated weighted value. For example, in the case where a language model generated for the sixties or older has a weighted value of 0.6, and a language model generated for the forties to fifties has a weighted value of 0.4, the language model interpolator 153 may interpolate the general language model by using only the data from the language model having probabilities greater than a specific level. In another example, the language model interpolator 153 may interpolate the general language model by applying both a language model group generated for the sixties or older and a language model group generated for the forties to fifties. In another example, the language model interpolator 153 may interpolate the general language model by applying language model groups generated for the teenagers to thirties, forties to fifties, or sixties or older, or any combination thereof.

Figure 3:
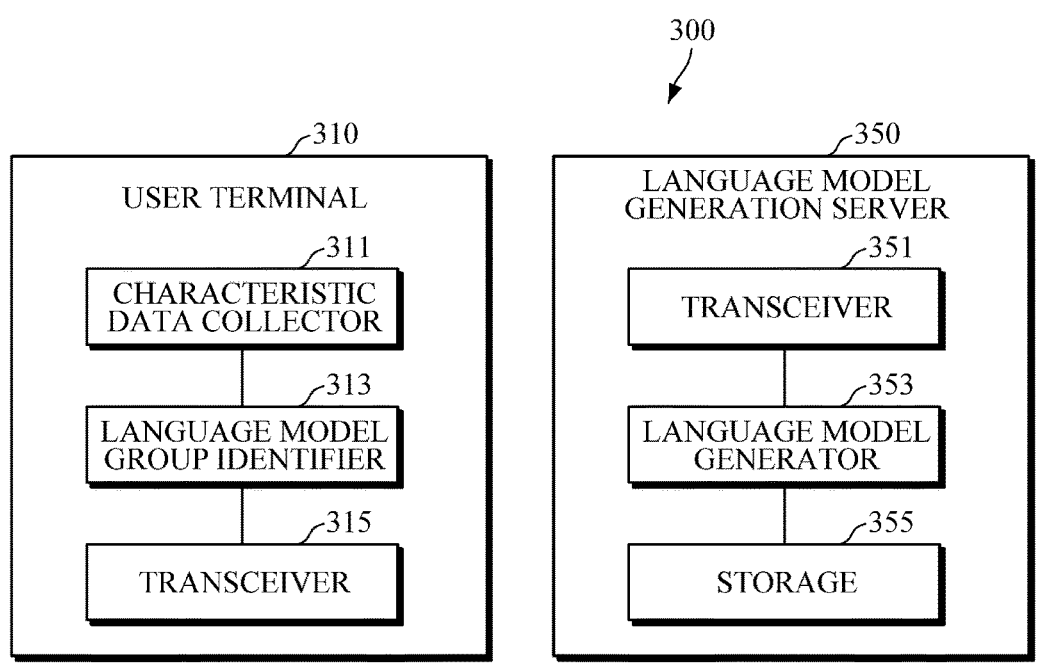
FIG. 3 is a block diagram illustrating a user-based language model generating system according to an embodiment.

FIG. 3 is a block diagram illustrating a user-based language model generating system 300 according to an embodiment. Referring to FIG. 3, the system 300 may include a user terminal 310 and the language model generation server 350.

The user terminal 310 includes a characteristic data collector 311, a language model group identifier 313, and a transceiver 315. The characteristic data collector 311 and the language model group identifier 313 may be an embodiment of the characteristic data collector 110 and the language model group identifier 130 illustrated in FIG. 1, though embodiments are not limited thereto.

The characteristic data collector 311 may collect characteristic data of a user, which includes at least one of the following: static information that includes one or more of gender, age, address, frequently used applications, and biometric data; and dynamic information that includes one or more of a tone, amplitude, and tempo of a user's voice, and frequently used keywords, which may change depending on circumstances. The characteristic data collector 311 may collect characteristic data of a user by retrieving information retrieved and/or stored in or from one or more user terminals, and/or by retrieving text data and other data from applications running or installed on the user terminal and such other terminals.

In an embodiment, the characteristic data collector 311 presents a specific image or inquiry through an interface of a user terminal and receives a user's response to the image or inquiry through a microphone embedded in the user terminal, to collect the characteristic data of the user based on the user's response. For example, the characteristic data collector 311 may generate inquiries by using criteria that are the same as or similar to the ones used to generate the language model that will be applied in recognizing the user's speech. For example, in the case where the characteristic data collector 311 generates a language model based on a user's age and gender, the characteristic data collector 110 may generate inquiries about age and gender or may obtain that information otherwise.

In another example, the characteristic data collector 311 may generate inquiries by extracting a keyword regarding at least one of a specific subject and specific circumstances. In this example, the characteristic data collector 311 may extract a smartphone as a keyword, and may generate an image or inquiry related to a smartphone to make an inquiry to a user. In this case, the characteristic data collector 311 may select at least one or more keywords that have high similarity in each language model group, and at the same time have low similarity between language model groups.

The language model group identifier 313 may identify a language model group based on the characteristic data of a user. For example, the language model group identifier 313 may select a language model group by using the characteristic data collected by the characteristic data collector 311. For example, in the case where a language model group is generated based on a user's age, the language model group identifier 313 may extract information regarding a user's age from the user characteristic data to identify a language model group to be applied to the user, and may provide data regarding the identified language model group to an apparatus for generating a language model through the transceiver 315. The transceiver 315 transmits the data regarding the identified language model group from the user terminal 310 to the language model generation server 350.

The transceiver 315 may use any one communication method among LAN, Wi-Fi, Bluetooth, Infrared Data Association (IrDA), HomeRF, Near-Field Communication (NFC), Ultra Wide Band (UWB), ZigBee, Global System for Mobile Communications, Code Division multiple Access (CDMA), Long Term Evolution (LTE), and Wireless Broadband (WiBro). The transceiver 315 may include an antenna for transmitting and receiving communication signals from the methods discussed above. However, the communication method used by the transceiver 315 is not limited thereto, and the transceiver 315 may also use other communication methods for communication between devices.

The language model generation server 350 includes a transceiver 351, a language model generator 353, and a storage 355, in which the language model generator 353 may be an embodiment of the language model generator 150 illustrated in FIG. 1, though embodiments are not limited thereto.

The transceiver 351 receives data regarding language model groups from the user terminal 310, and uses the same communication methods as the methods used by the transceiver 315. In an embodiment, the user terminal 310 may provide the data regarding language model groups to a cloud based server or a relay, which may provide the same to the language model generation server 350 or from which the data regarding language model groups may be requested.

The language model generator 353 selects a language model group based on language model group information received from the user terminal 310, and interpolates the general language model based on the selected language model group, to generate a language model to be applied to a user. For example, the language model generator 353 may add new words to the general language model, or may change the order of words or probabilities of the order of words by using words in the selected language model group, the order of the words, and probabilities of the order of words.

The storage 355 stores a language model generated by the language model generator 353 and to be applied to a user. Further, the storage 355 may store user identification and a language model index for each user if there are different users of the user terminal 310. The user terminal 310 may retrieve a language model for speech recognition from the storage 355. For example, the user identification data and the language model index of each user may be generated by the characteristic data collector 311 or the language model group identifier 313. Alternatively, the language model generation server 350 may provide the user terminal the stored data regarding language model groups or provide the same to the cloud based server or a relay for forwarding/requesting to/by the user terminal 310.

The language model in the user terminal 310 may be updated routinely through similar communications with the language model generation server 350, such as when the user terminal 310 is updated using external information by the language model generation server 350.

Figure 4:
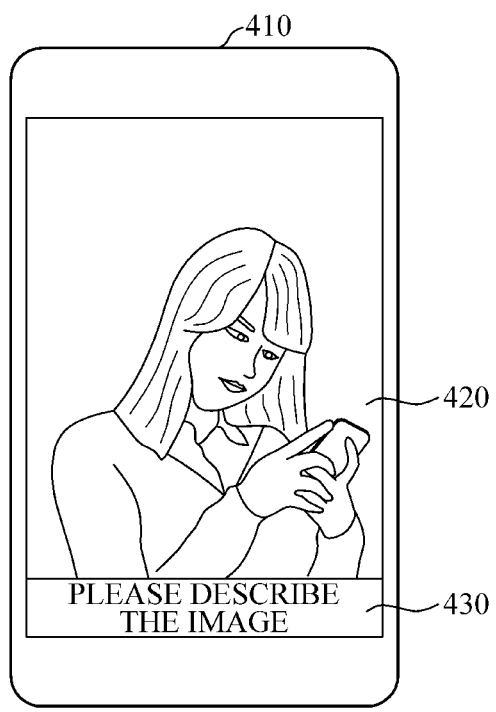
FIG. 4 is a diagram illustrating a method of collecting characteristic data of a user according to an embodiment.

FIG. 4 is a diagram illustrating a method of collecting characteristic data of a user according to an embodiment. Referring to FIG. 4, an example apparatus 410 generating a language model includes an interface which provides an inquiry to a user and receives a user's response to the inquiry. The apparatus 410 may correspond to the apparatus 100 and the user terminal 310 of FIGS. 1 and 3, respectively, for example, though embodiments are not limited thereto. In an embodiment, the apparatus 410 generating a language model includes an interface, through which a specific image or inquiry may be shown to a user. For example, the apparatus 410 generating a language model may present an image 420 of a specific object or specific circumstances or an inquiry 430 to draw a specific response from a user.

The inquiry may be made by extracting a keyword related to at least one of a specific object and a specific circumstance. For example, the apparatus 410 for generating a language model may extract a "smartphone" and "human being" as keywords, and may make an inquiry by generating an image or an inquiry related to a smartphone or human being. In this case, a user makes a response to the image 420 or the inquiry 430, and the apparatus 410 for generating a language model collects characteristic data of the user based on the user's response.

For example, upon seeing the image 420 or the inquiry 430, users may make responses, such as "a girl is viewing her cellphone," "a woman is viewing her smartphone," or "a female student is using a Social Networking Service (SNS) with her smartphone." The apparatus 410 for generating a language model receives a user's response and generates characteristic data of the user. For example, if a user's response is "a girl is viewing a cellphone," the apparatus 410 generating a language model may extract keywords "girl" and "cellphone" as keywords related to "smartphone" and "human being", which may be used to generate characteristic data of the user. In another example, if a user's response is "a woman is viewing her smartphone," the apparatus 410 for generating a language model may extract keywords "woman" and "smartphone" as keywords which may be used to generate characteristic data of the user.

Further, the apparatus 410 for generating a language model may perform matching of the generated user characteristic data with each language model group to identify a language model group. For example, in the case where keywords "girl" and "cellphone" are matched the most with a language model group generated for the sixties or older, the apparatus 410 for generating a language model may identify the language model group as a language model group of the user. In another example, in the case where keywords "woman" and "smartphone" are matched the most with a language model group generated for teenage girls, the apparatus 410 for generating a language model may identify that language model group as a language model group of the user.

Figure 5:
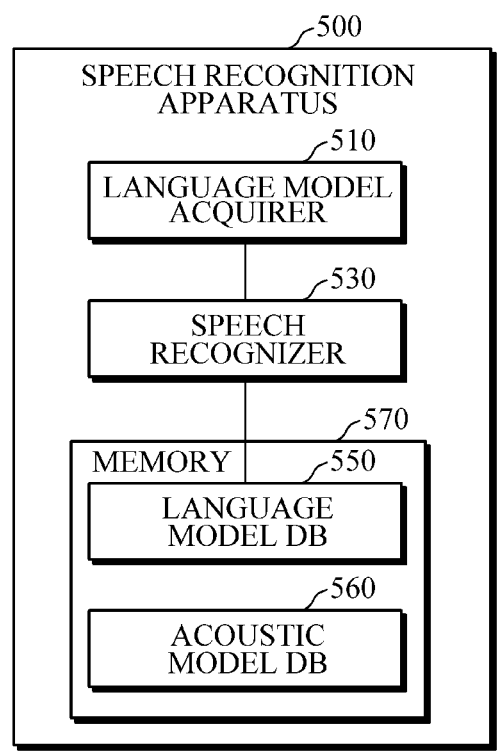
FIG. 5 is a block diagram illustrating a speech recognition apparatus according to an embodiment.

FIG. 5 is a block diagram illustrating a speech recognition apparatus 500 according to an embodiment. Referring to FIG. 5, the speech recognition apparatus 500 includes a language model acquirer 510, a speech recognizer 530, and a memory 570. The memory 570 may include a language model database (DB) 550 and an acoustic model DB 560. The speech recognition apparatus 500 may be a server that is connected with a user terminal, in which the speech recognition apparatus 500 may further include a transceiver having an antenna for communication with the user terminal.

In an embodiment, the language model acquirer 510 receives a user's speech recognition request from the user terminal through the transceiver, in which the speech recognition request includes data related to a user. For example, once a user requests speech recognition through a terminal, the terminal generates user information by recognizing the user's speech or by using product information of the terminal, and provides the generated user information to the speech recognition apparatus 500 in response to a speech recognition request.

As described above, by receiving the user information from the user terminal, the language model acquirer 510 identifies a user that has requested speech recognition. Subsequently, in an embodiment, the language model acquirer 510 acquires a language model to be applied to a user from the language model DB 550 that stores a user-based language model based on the user information received from the user terminal. That is, the language model acquirer 510 acquires a language model by retrieving a language model to be applied to a user from the language model DB 550 which is generated by the apparatus for generating a user-based language model. The language model DB 550 may be stored in a memory 570 included in the speech recognition apparatus 500 or may be an external memory communicating with the speech recognition apparatus 500 through the transceiver. For example, the DB 550 may be stored on a memory of a server.

According to one or more embodiments, the language model acquirer 510 acquires a user-based language model by determining, in response to a user's speech recognition request, a language model group to be applied to the user from one or more language model groups and by interpolating the general language model based on the determined language model group. For example, based on the user information received from the user terminal, the language model acquirer 510 may retrieve a language model group to be applied to a user from the language model DB 550. Further, the language model acquirer 510 may acquire a language model to be applied to a user by retrieving the general language model from the language model DB 550 and then by interpolating the general language model based on a language model group to be applied to a user.

By using the acquired user-based language model, the speech recognizer 530 recognizes speech of a user that has requested speech recognition. The speech recognizer may also recognize speech using the acoustic model from the acoustic model DB 560, and compare the user-based results of the language model and the acoustic model to recognize the user's speech. In an embodiment, the speech recognizer 530 may use recognition methods, such as Hidden Markov Model (HMM), Dynamic Time Warping (DTW), and Neural Networks. However, the recognition method used by the speech recognizer 530 is not limited thereto, and the speech recognizer 530 may use any other recognition methods.

Further, upon completing speech recognition, the speech recognizer 530 may provide results of the recognition to the user terminal that has requested the speech recognition. The language model DB 550 may store the general language model, language model groups, and at least one of language models to be applied to each user.

According to one more embodiments, the speech recognition apparatus 500 may be included in the user terminal to recognize a user's speech. In this case, according to one or more embodiments, the user terminal includes the language model DB 550 that stores a language model to be applied to a user. To this end, the user terminal may further include a request receiver that receives a user's speech through a microphone included in the user terminal and generates a user's speech recognition request.

Upon receiving the user's speech recognition request from the request receiver, the language model acquirer 510 reads out a language model of a user from the language model DB 550. In this case, the language model of a user may be a language model that has been generated by the apparatus for generating a user-based language model at the time of initialization of a user terminal or an application running in the user terminal. The apparatus for generating a user-based language model may be mounted in the user terminal, or in an external server and connected with the user terminal through a network.

Alternatively, in response to a user's speech recognition request, the language model acquirer 510 acquires a language model to be applied to a user from a language model generation server. For example, in response to a user's speech recognition request, the language model acquirer 510 collects characteristic information of a user, which includes information on a user that has requested speech recognition, and acquires language model group identification information for the user by using the collected characteristic information. Further, upon acquiring the language model group identification information, the language model acquirer 510 may transmit the language model group identification information to the language model generation server to request a user-based language model to be applied to the user, and may receive the user-based language model, generated based on the language model group identification information, from the language model generation server. Then, the speech recognizer 530 may recognize a user's speech by using the user language model read from the language model DB 550.

Figure 6:
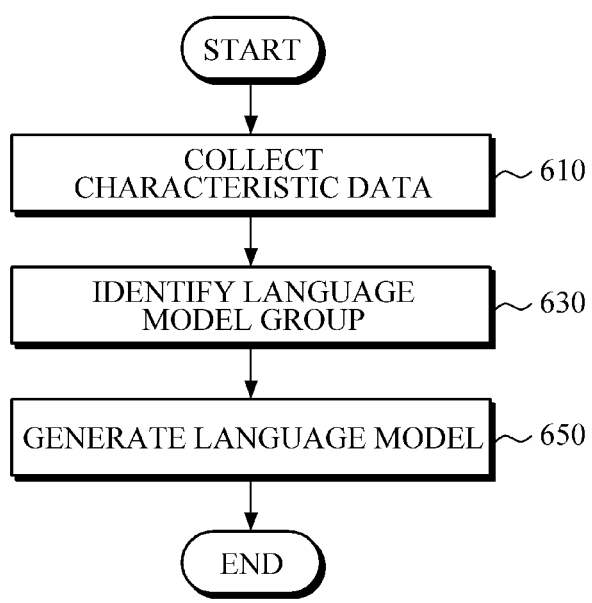
FIG. 6 is a flowchart illustrating a method of generating a user-based language model according to an embodiment.

FIG. 6 is a flowchart illustrating a method of generating a user-based language model according to an embodiment. Referring to FIG. 6, the apparatus for generating a user-based language model may collect characteristic data of a user to generate a language model to be applied to the user in operation 610. The user characteristic data may include at least one of the following: static information that includes one or more of gender, age, address, frequently used applications, and biometric data; and dynamic information that includes one or more of a tone, amplitude, and tempo of a user's voice, and frequently used keywords, which may change depending on circumstances.

For example, the apparatus for generating a user-based language model may collect characteristic data of a user by retrieving information stored in electronic devices used by the user, or by retrieving text data and other data from applications used by the user.

According to another example, the apparatus generating a user-based language model presents a specific image or inquiry to a user, and collects characteristic data of the user based on the user's response to the image or inquiry. To this end, the apparatus for generating a user-based language model may generate inquiries about a user according to at least one or more of criteria among types and frequency of use of mass media frequently used by a user, types and frequency of use of Internet media frequently used by a user, age, gender, place of birth, residence, occupation, education level, hobby, and field of interest.

According to another example, the apparatus for generating a user-based language model may generate inquiries by extracting a keyword regarding at least one of a specific subject and specific circumstances. For example, the apparatus for generating a user-based language model may extract a smartphone as a keyword, and generates an image or inquiry related to a smartphone to make an inquiry to a user.

In operation 630, the apparatus for generating a user-based language model may identify a language model group to be applied to a user by using the collected user characteristic data. For example, in the case where a language model group is generated based on a user's age, the apparatus for generating a user-based language model extracts information regarding a user's age from the user characteristic data, and may identify a language model group to be applied to the user. For example, in the case where different words are used for a smartphone depending on age groups of users, the apparatus for generating a user-based language model extracts a word, which is similar to a smartphone, from the user characteristic data, and performs matching of the extracted word with each language model group to identify a language model group that has the highest similarity.

In operation 650, Upon identifying a language model group to be applied to a user, the apparatus for generating a user-based language model interpolates the general language model based on the identified language group to generate a language model to be applied to the user.

For example, the language model may be a network that specifies words that may come after each word. In this case, the apparatus for generating a user-based language model forms a new network by reflecting the types ad probabilities of words that may follow each word included in the identified general language model into words and probabilities of the words included in the identified language model group.

Figure 7:
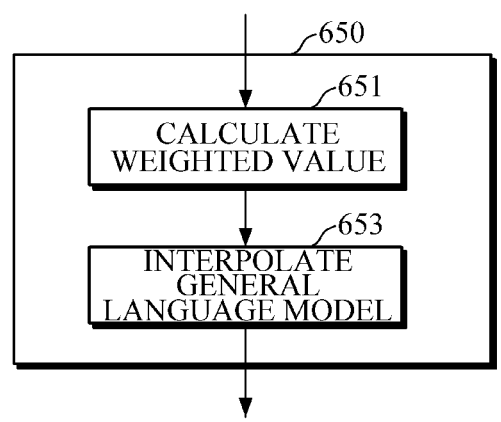
FIG. 7 is a flowchart illustrating a method of generating a language model according to an embodiment.

FIG. 7 is a flowchart illustrating a method of generating a language model 650 according to an embodiment. Referring to FIG. 7, an apparatus generating a user-based language model generates a language model, e.g., operation 650 illustrated in FIG. 6, by calculating a weighted value in operation 651 and interpolating the general language model in operation 653. In operation 651, the apparatus generates a language model based on a similarity between characteristic data of a user and the determined language model group in 651.

For example, the apparatus may select a language model group by extracting information on a user's age from the characteristic data of the user, and the probability of age being sixties or older may be calculated to be 0.6, and the probability of age being forties to fifties may be calculated to be 0.4. In this case, a weighted value of the language model generated for the sixties or older is calculated to be 0.6, and a weighted value of the language model generated for the forties to fifties is calculated to be 0.4.

In operation 653, the apparatus for generating a user-based language model interpolates the general language model based on the calculated weighted values from operation 651. For example, in the case where a language model generated for sixties or older has a weighted value of 0.6, and a language model generated for the forties to fifties has a weighted value of 0.4, the apparatus for generating a user-based language model interpolates the general language model by using only the data included in the language model having probabilities greater than a specific level. In another example, the apparatus for generating a user-based language model interpolates the general language model by applying both the language model group generated for the sixties or older and the language model group generated for the forties to fifties.

The apparatus generating user based language model 100, characteristic data collector 110, characteristic data collector 311, language model group identifier 130, language model group identifier 313, language model generator 150, language model generator 353, weighted value calculator 151, language model interpolator 153, user terminal 310, user terminal 410, transceiver 315, transceiver 351, storage 355, language model generation server 350, user-based language model generating system 300, speech recognition apparatus 500, language model acquirer 510, speech recognizer 530, language model database 550, acoustic model database 560, memory 570, in FIG. 1-5 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMS, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

As a non-exhaustive example only, a terminal, apparatus, or device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus comprising:
a characteristic data collector configured to collect characteristic data of a user;
a language model group identifier configured to
obtain a plurality of language model groups, each language model group comprising respective group characteristic data and at least one respective custom language model, and
determine a probability that the characteristic data of the user matches group characteristic data of one of the plurality of language model groups;
a language model acquirer configured to acquire a custom language model of the one of the plurality of language model groups based on the determined probability; and
a language model generator configured to generate a user-based language model by interpolating a general language model for speech recognition with the acquired custom language model based on the determined probability.

2. The apparatus of claim 1, wherein the characteristic data collector is configured to present a specific image or inquiry to the user, and collect the characteristic data of the user based on a response of the user to the image or inquiry.

3. The apparatus of claim 1, wherein the characteristic data of the user includes either one or both of:
static information that includes any one or any combination of any two or more of gender, age, address, frequently used applications, and biometric data; and
dynamic information that includes any one or any combination of any two or more of a tone, amplitude, and tempo of a user's voice, and frequently used keywords.

4. The apparatus of claim 1, wherein the apparatus is a speech recognition apparatus that further comprises a speech recognizer configured to recognize speech of the user based on the user-based language model.

5. The apparatus of claim 2, wherein the language model group identifier is further configured to use the response of the user to select the custom language model from among a plurality of respective custom language models of the plurality of language model groups.

6. The apparatus of claim 1, wherein:
the language model identifier is further configured to determine a second probability that the characteristic data of the user matches group characteristic information of a second language model group of the plurality of language model groups;
the language model acquirer is further configured to acquire a second custom language model of the second language model groups based on the determined second probability; and
the language model generator is further configured to generate the user-based language model by interpolating the general language model with the acquired custom language model and with the second custom language model, based on the determined second probability.

7. The apparatus of claim 6, wherein the language model generator is further configured to generate the user-based language model by interpolating the general language model with a selected custom language model,
wherein the selected custom language model is selected from among the acquired custom language model and the second custom language model based on whether the probability or the second probability is greater.

8. The apparatus of claim 6, wherein the language model generator is further configured to generate the user-based language model by interpolating the general language model with both the acquired custom language model and the second custom language model according to the probability and the second probability.

9. A method of generating a user-based language model for speech recognition, the method comprising:
collecting characteristic data of a user;
obtaining a plurality of language model groups, each language model group comprising respective group characteristic data and at least one respective custom language model;
determining a probability that the characteristic data of the user matches group characteristic data of one of the plurality of language model groups;
acquiring a custom language model of the one of the plurality of language model groups based on the determined probability; and
generating a user-based language model by interpolating a general language model with the acquired custom language model based on the determined probability.

10. The method of claim 9, wherein the collecting of the characteristic data of the user comprises presenting a specific image or inquiry to the user, and collecting the characteristic data of the user based on a response of the user to the image or inquiry.

11. The method of claim 9, wherein the characteristic data of the user includes either one or both of:
static information that includes any one or any combination of any two or more of gender, age, address, frequently used applications, and biometric data; and
dynamic information that includes any one or any combination of any two or more of a tone, amplitude, and tempo of a user's voice, and frequently used keywords.

12. A speech recognition apparatus, comprising:
a processor configured to:
acquire a user-based language model selectively derived from a general language model, upon receiving a speech recognition request from a user; and
recognize speech of the user based on the acquired user-based language model,
wherein the user-based language model is selectively derived from the general language model by interpolating the general language model based on characteristics of a selected custom language model from among a plurality of custom language models comprised within respective language model groups, the selected custom language model comprised within a selected language model group from among the language model groups that has a probability that characteristic information of the user matches group characteristic information of the selected language model group, and
wherein the characteristics comprise any one or any combination of any two or more of additional words, order of words, or probabilities of word orders.

13. The speech recognition apparatus of claim 12, wherein the processor comprises:
a language model acquirer, configured to acquire the user-based language model upon receiving the speech recognition request from the user; and
a speech recognizer configured to recognize the speech of the user based on the acquired user-based language model.

14. The apparatus of claim 13, wherein the language model acquirer is further configured to select the user-based language model from a language model database that stores a plurality of user-based language models for different users in a memory.

15. The apparatus of claim 14, wherein, in response to the speech recognition request of the user, the language model acquirer is further configured to generate each of the plurality of user-based language models corresponding to the different users by determining a respective custom language model from one or more language model groups and by interpolating the general language model for speech recognition with the respective custom language model for each of the different users.

16. The apparatus of claim 12, wherein the speech recognition apparatus is a smartphone, tablet, laptop, or smartwatch.

17. A non-transitory computer readable medium comprising instructions that, when executed by a computer, cause a processor to perform a method comprising:
collecting characteristic data of a user;
obtaining a plurality of language model groups, each language model group comprising respective group characteristic information and at least one respective custom language model;
determining a probability that the characteristic information of the user matches group characteristic information of one of the plurality of language model groups;
acquiring a custom language model of the one of the plurality of language model groups based on the determined probability; and
generating a user-based language model by interpolating a general language model with the acquired custom language model based on the determined probability.

* * * * *